(12) United States Patent
Uruma

(10) Patent No.: US 10,362,181 B2
(45) Date of Patent: Jul. 23, 2019

(54) FACSIMILE APPARATUS, CONTROL METHOD THEREOF, AND STORAGE MEDIUM

(71) Applicant: CANON KABUSHIKI KAISHA, Tokyo (JP)

(72) Inventor: Kazuhiro Uruma, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/908,476

(22) Filed: Feb. 28, 2018

(65) Prior Publication Data

US 2018/0262628 A1 Sep. 13, 2018

(30) Foreign Application Priority Data

Mar. 10, 2017 (JP) ................................. 2017-046506

(51) Int. Cl.
*H04N 1/00* (2006.01)
*H04N 1/32* (2006.01)

(52) U.S. Cl.
CPC ....... *H04N 1/0022* (2013.01); *H04N 1/00206* (2013.01); *H04N 1/32096* (2013.01)

(58) Field of Classification Search
USPC ....................................................... 358/1.14
See application file for complete search history.

(56) References Cited

U.S. PATENT DOCUMENTS

| 5,898,504 A | 4/1999 | Okada et al. ................... 358/75 |
| 6,023,345 A * | 2/2000 | Bloomfield ........... H04L 51/066 358/402 |
| 2013/0088741 A1* | 4/2013 | Murata ................ H04N 1/0022 358/1.14 |
| 2015/0172474 A1 | 6/2015 | Uruma ................... H04N 1/001 |

FOREIGN PATENT DOCUMENTS

JP H11-41406 2/1999

* cited by examiner

*Primary Examiner* — Neil R McLean
*Assistant Examiner* — Darryl V Dottin
(74) *Attorney, Agent, or Firm* — Venable LLP

(57) ABSTRACT

A facsimile apparatus includes a memory device that stores a user name and a notification destination of a transmission result of facsimile transmission in association with each other. The facsimile apparatus receives, from an external apparatus, a facsimile transmission instruction that includes image data, a transmission destination of facsimile transmission, and a user name; executes, for the transmission destination included in the facsimile transmission instruction, facsimile transmission of the image data included in the facsimile transmission instruction; and transmits a transmission result of the executed facsimile transmission to the notification destination stored in the memory device in association with the user name included in the facsimile transmission instruction.

10 Claims, 7 Drawing Sheets

FIG. 3

| 301 | JOB NAME | | test_a4 |
|---|---|---|---|
| 302 | LOGIN NAME | | tanaka |
| 303 | DOMAIN NAME | | conon |
| 304 | COMMUNICATION TYPE | | TRANSMISSION |
| 305 | JOB SUBMISSION TIME | | 2016.06.20 10:46 |
| 306 | JOB START TIME | | NONE |
| 307 | LINE SELECTION | | AUTOMATIC |
| 308 | DESTINATION INFORMATION | DESTINATION NUMBER | 0441113333 |
| | | DESTINATION NAME | COMPANY R |
| | | F-CODE | NONE |
| | | PASSWORD | NONE |
| 309 | DOCUMENT INFORMATION | ENCODING TYPE | MMR |
| | | RESOLUTION | 200dpi |
| | | SHEET SIZE | A4 |
| | | STORAGE LOCATION ADDRESS | 0x10000 |

FIG. 4

| 401 | 402 | 403 | 404 | 405 | 406 | 407 | 408 | 409 |
|---|---|---|---|---|---|---|---|---|
| LOGIN NAME | TRANSMISSION DATA AND TIME | COMMUNI-CATION DURATION | DESTINATION NAME | DESTINATION ADDRESS | IDENTIFICATION NUMBER | COMMUNI-CATION MODE | SHEET COUNT | ERROR CODE |
| uchida | 2016/6/19 13:10 | 20 | COMPANY A | 0441112222 | 0001 | TRANSMISSION | 1 | 0 |
| katou | 2016/6/19 14:15 | 22 | COMPANY B | 0441113333 | 0002 | TRANSMISSION | 1 | 0 |
| arai | 2016/6/19 15:20 | 20 | COMPANY C | 0441114444 | 0003 | TRANSMISSION | 1 | 0 |
| inoue | 2016/6/19 16:25 | 21 | COMPANY D | 0441110001 | 0004 | TRANSMISSION | 1 | 10755 |
| uchida | 2016/6/19 17:30 | 24 | COMPANY E | 0441110002 | 0005 | TRANSMISSION | 1 | 0 |
| kimura | 2016/6/19 18:35 | 57 | COMPANY F | 0441110003 | 0006 | TRANSMISSION | 3 | 0 |
| uchida | 2016/6/19 19:40 | 55 | COMPANY G | 0441110004 | 0007 | TRANSMISSION | 3 | 0 |
|  | 2016/6/19 20:45 | 55 | COMPANY H | 0441110005 | 0008 | TRANSMISSION | 3 | 0 |
| sasaki | 2016/6/19 21:50 | 58 | COMPANY I | 0441110006 | 0009 | TRANSMISSION | 3 | 0 |
| yamada | 2016/6/19 22:55 | 55 | COMPANY J | 0441110007 | 0010 | TRANSMISSION | 3 | 0 |
| nagai | 2016/6/20 3:07 | 55 | COMPANY K | 0441110008 | 0011 | TRANSMISSION | 3 | 0 |
| nagano | 2016/6/20 4:08 | 40 | COMPANY L | 0441110009 | 0012 | TRANSMISSION | 2 | 10755 |
| sasaki | 2016/6/20 5:09 | 55 | COMPANY M | 0441110010 | 0013 | PCFAX TRANSMISSION | 3 | 0 |
|  | 2016/6/20 6:10 | 55 | COMPANY N | 0441110011 | 0014 | TRANSMISSION | 3 | 0 |
| katou | 2016/6/20 7:11 | 55 | COMPANY O | 0441110012 | 0015 | TRANSMISSION | 3 | 0 |
| ishii | 2016/6/20 8:22 | 60 | COMPANY P | 0441110013 | 0016 | TRANSMISSION | 3 | 10755 |
|  | 2016/6/20 9:33 | 18 | COMPANY Q | 0441118888 | 0017 | TRANSMISSION | 1 | 0 |
| tanaka | 2016/6/20 10:46 | 22 | COMPANY R | 0441113333 | 0018 | PCFAX TRANSMISSION | 1 | 0 |

FIG. 7

| LOGIN NAME | DOMAIN NAME | RESULT NOTIFICATION DESTINATION ADDRESS |
|---|---|---|
| tanaka | conon | tanaka@conon.co.jp |
| sasaki | conon | sasaki@conon.co.jp |
| yamada | conon | yamada@conon.co.jp |
| suzuki | conon | suzuki@conon.co.jp |
| ishii | conon | ishii@conon.co.jp |
| ueno | conon | ueno@conon.co.jp |
| kimura | conon | kimura@conon.co.jp |
| satou | conon | satou@conon.co.jp |
| itou | conon | itou@conon.co.jp |
| katou | conon | katou@conon.co.jp |
| hayashi | conon | hayashi@conon.co.jp |
| shimizu | conon | shimizu@conon.co.jp |
| mori | conon | mori@conon.co.jp |

FIG. 8

```
*********************
*** FAX TRANSMISSION RESULT ***
*********************

RECEPTION NUMBER          0018
START TIME                06/20 10:46
PAGE COUNT                1

UNTRANSMITTED DESTINATION  ----
TRANSMITTED DESTINATION    0441113333
ERROR DESTINATION          ----
```

FACSIMILE APPARATUS, CONTROL METHOD THEREOF, AND STORAGE MEDIUM

BACKGROUND OF THE INVENTION

Field of the Invention

The present invention relates to a facsimile apparatus that transmits information via a network, a control method thereof, and a storage medium.

Description of the Related Art

There is a facsimile transmission system that transmits a facsimile transmission request from a client terminal (PC) to a facsimile apparatus via a network, and performs facsimile transmission to a transmission destination apparatus. Hereinafter, facsimile transmission in such a facsimile transmission system is referred to as "PCFAX transmission". At the end of PCFAX transmission, the user can confirm the transmission result with reference to a transmission result report printed/output from an image communication apparatus that has performed facsimile transmission. It is becoming important to be able to easily confirm the facsimile transmission result at a client terminal, and one example of the method for achieving this is a transmission result notification method using email.

Japanese Patent Laid-Open No. 11-41406 proposes, as transmission result notification using email, a technique by which a notification destination of a transmission result is transmitted to an image communication apparatus together with image data and a transmission destination at the time of instructing PCFAX transmission to the image communication apparatus from an external apparatus. Then, when the PCFAX transmission ends, an email indicating a transmission result is transmitted to the received notification destination.

However, the above-described conventional technique has the following problems to be solved. For example, the above-described conventional technique requires a notification destination of a transmission result to be input at the client terminal at the time of instructing PCFAX transmission. Accordingly, each time the user receives a transmission result, the user needs to perform an input operation, resulting in a troublesome operation system. Further, an erroneous input during input poses the problem that the user cannot receive the transmission result.

SUMMARY OF THE INVENTION

The present invention enables realization of a mechanism that enables the user to receive a transmission result without the need to input a notification destination of a transmission result when a request for PCFAX transmission is made to an image communication apparatus from an external apparatus.

One aspect of the present invention provides a facsimile apparatus comprising: a memory device that stores a user name and a notification destination of a transmission result of facsimile transmission in association with each other; and at least one processor that executes a set of instructions to: receive, from an external apparatus, a facsimile transmission instruction that includes image data, a transmission destination of facsimile transmission, and a user name; execute, for the transmission destination included in the facsimile transmission instruction, facsimile transmission of the image data included in the facsimile transmission instruction; and transmit a transmission result of the executed facsimile transmission to the notification destination stored in the memory device in association with the user name included in the facsimile transmission instruction.

Another aspect of the present invention provides a control method of a facsimile apparatus including a memory device that stores a user name and a notification destination of a transmission result of facsimile transmission in association with each other; the control method comprising: receiving, from an external apparatus, a facsimile transmission instruction including image data, a transmission destination of facsimile transmission, and user information; executing, for the transmission destination included in the facsimile transmission instruction, facsimile transmission of the image data included in the facsimile transmission instruction; and transmitting a transmission result of the executed facsimile transmission to the notification destination stored in the memory device in association with the user name included in the facsimile transmission instruction.

Still another aspect of the present invention provides a non-transitory computer-readable storage medium storing a computer program for causing a computer to execute steps of a control method of a facsimile apparatus including a memory device that stores a user name and a notification destination of a transmission result of facsimile transmission in association with each other, the control method comprising: receiving, from an external apparatus, a facsimile transmission instruction including image data, a transmission destination of facsimile transmission, and user information; executing, for the transmission destination included in the facsimile transmission instruction, facsimile transmission of the image data included in the facsimile transmission instruction; and transmitting a transmission result of the executed facsimile transmission to the notification destination stored in the memory device in association with the user name included in the facsimile transmission instruction.

Further features of the present invention will be apparent from the following description of exemplary embodiments with reference to the attached drawings.

BRIEF DESCRIPTION OF THE DRAWINGS

FIG. 3 is a diagram showing PCFAX transmission job information received by the image communication apparatus 104 according to an embodiment.

FIG. 4 is a diagram showing transmission history information included in the image communication apparatus 104 according to an embodiment.

FIG. 7 is a diagram showing a list table of result notification destination included in the image communication apparatus 104 according to an embodiment.

FIG. 8 is a diagram showing a display example of a transmission result report according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of System

Figure 1:
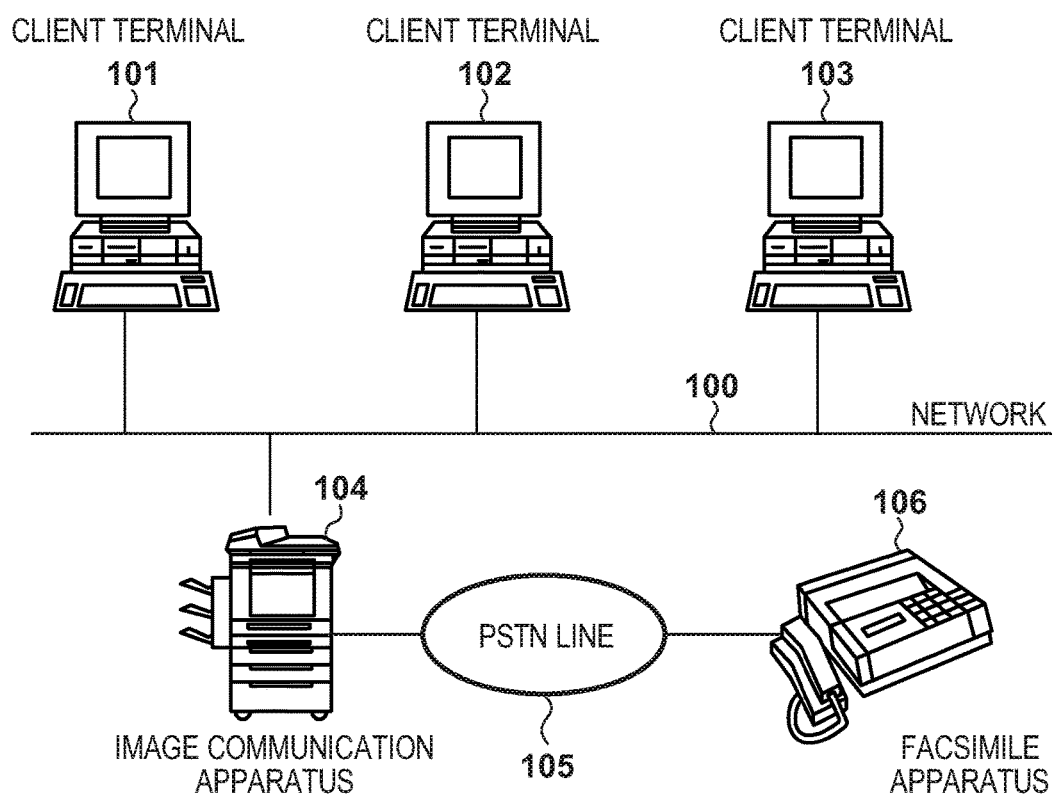
FIG. 1 is a diagram showing a network configuration of a system according to an embodiment.

In the following, a first embodiment according to the present invention will be described. First, a network configuration of a system according to the present embodiment will be described with reference to FIG. 1. In FIG. 1, client terminals (external apparatuses) 101, 102, and 103, an image communication apparatus 104, and a facsimile apparatus 106 are connected to a network 100.

The client terminals 101, 102, and 103 are personal computers (PCs) such as image processing apparatuses, and request PCFAX transmission to the image communication apparatus 104. The image communication apparatus 104 can receive a PCFAX transmission request from the client terminals 101, 102, and 103, and perform PCFAX transmission. In addition, a PSTN line 105, which is a general public line, is connected to the image communication apparatus 104, and the image communication apparatus 104 is capable of performing facsimile communication with the facsimile apparatus 106 via the PSTN line 105.

Configuration of Image Communication Apparatus

Figure 2:
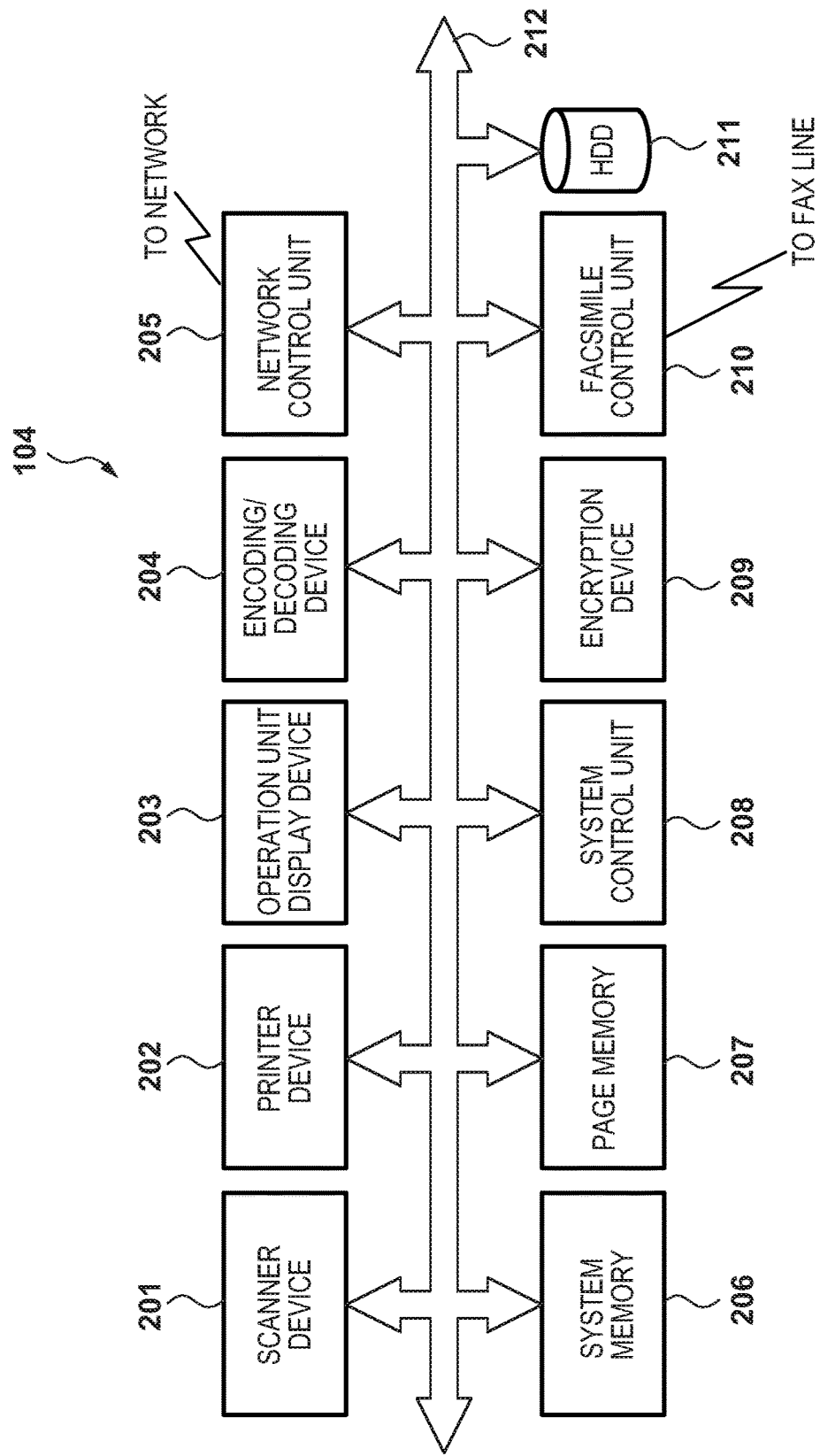
FIG. 2 is a block diagram showing a configuration example of an image communication apparatus 104 according to an embodiment.

Next, a configuration of an image communication apparatus 104 according to the present embodiment will be described with reference to FIG. 2. The image communication apparatus 104 includes a scanner device 201, a printer device 202, an operation unit display device 203, an encoding/decoding device 204, a network control unit 205, a system memory 206, a page memory 207, a system control unit 208, an encryption device 209, a facsimile control unit 210, and an HDD 211.

The scanner device 201 is a reading device that scans a document with a designated mode (for example, a sheet size, a resolution, a density, or the like). The printer device 202 performs printing on a recording medium such as a sheet in accordance with image data, and outputs the printed material onto a sheet discharge tray via a sheet discharge device such as a finisher. The operation unit display device 203 is a user interface including an input unit through which the user performs various setting operations, and a display unit that displays the operating state and the like of the apparatus. The encoding/decoding device 204 encodes image information that is to be transmitted, and compresses the encoded information. In addition, the encoding/decoding device 204 decodes the received compressed data, and restores the decoded data into the original image information.

The system memory 206 includes an SRAM unit and a ROM unit. Pre-registered information such as user mode information is stored in the SRAM unit, and the control program of the image communication apparatus of the present embodiment is stored in the ROM unit. The page memory 207 is a memory area where one page of image information is expanded at the time of performing encoding/decoding. The system control unit 208 is a microcomputer that monitors and controls the control units, the devices, the HDD (hard disk drive) 211 and the like included in the present block diagram. The HDD 211 is a nonvolatile storage medium, and stores received documents, scanned documents, and the like.

The encryption device 209 encrypts image data at the time of accumulating the image data into the HDD 211. When the image data is accumulated in an unencrypted state, the data encoded by the encoding/decoding device 204 is directly saved in the HDD 211. On the other hand, when the image data is accumulated in an encrypted state, the data encoded by the encoding/decoding device 204 is saved in the HDD 211 after being further encrypted by the encryption device 209.

The network control unit 205 connects to a LAN so as to input and output information to and from a device under another network environment. The facsimile control unit 210 is connected to a facsimile line such as the PSTN line 105, and is communicable with another facsimile apparatus 106 via the PSTN line 105.

PCFAX Transmission Job Information

Next, PCFAX transmission job information including PCFAX transmission instruction information that is submitted from a client terminal into the image communication apparatus 104 according to the present embodiment will be described with reference to FIG. 3.

After being received from the client terminal, PCFAX transmission job information 300 is saved in the SRAM unit included in the system memory 206. The PCFAX transmission job information 300 includes a job name 301, a login name 302, a domain name 303, a communication type 304, a job submission time 305, a job start time 306, a line selection 307, destination information 308, and document information 309.

As the job name 301, the name of a job notified from the client terminal is set. As the login name 302, the login name of a user that has submitted a PCFAX transmission job at the client terminal is set. For example, the login name 302 may be the login name of a user that has logged into the client terminal, or the login name used when a user logs into the image communication apparatus 104 via a driver of the image communication apparatus 104 in order to submit a PCFAX transmission job. That is, the login name may be any user name that enables identification of a user when the user logs into the client terminal or the image communication apparatus 104. As the domain name 303, the domain name of the client terminal is set. The communication type 304 is an area where a transmission mode is set, and one of transmission, broadcast transmission, timer transmission, and timer broadcast transmission is set.

As the job submission time 305, the time at which a PCFAX transmission job submitted by the client terminal is received is set. As the job start time 306, the time at which transmission is started is set when the PCFAX transmission job submitted by the client terminal is a time-designated transmission job, or in other words, a timer transmission job.

As the line selection 307, the number of a transmission line that is to be transmitted is set when the image communication apparatus 104 uses a plurality of lines. When line designation is not performed, "automatic" is set. As the destination information 308, information on a destination number, a destination name, an ITU-T F-code, and an ITU-T password, which is transmission destination information used to perform PCFAX transmission, is set. As the document information 309, document attribute information such as a type of compression, a resolution, and a document size, which is PCFAX transmission document information, and the address of image data that is temporarily stored in the HDD 211 are set.

In the example shown in FIG. 3, as the PCFAX transmission job information 300, information on the job name "test_a4", the login name "tanaka", the domain name "conon", the communication type "transmission", and the job submission time "2016/6/20 10:46" is set. In addition, information on the job start time "none", the line selection "automatic", the destination number "0441113333", the destination name "Company R", the F-code "none", the password "none", the document encoding type "MMR", and the document resolution "200 dpi" is set. Furthermore, information on the document size "A4", and the document storage location address "0x10000" is set.

Management Table for Transmission History

Next, a management table for managing the facsimile transmission histories of the image communication apparatus 104 according to the present embodiment will be described with reference to FIG. 4. A management table 400 for facsimile transmission histories is held in the HDD 211, and facsimile transmission information described in the following is stored as transmission history information for each communication. One piece of transmission history information includes a login name 401, a transmission data and time 402, a communication duration 403, a destination name 404, a destination address 405, an identification number 406, a communication mode 407, a sheet count 408, and an error code 409. Note that the facsimile transmission information managed with the management table 400 includes information on all types of facsimile transmission including PCFAX transmission.

A login name that is the user information of a person who has submitted a job is stored in the login name 401. At the time of the PCFAX transmission of the present embodiment, the login name 302 included in the PCFAX transmission job information 300 is stored. A communication start time is stored in the transmission data and time 402. A facsimile communication duration, in seconds, is stored in the communication duration 403. Information on the destination name is stored in the destination name 404, and the telephone number of the destination is stored in the destination address 405. At the time of PCFAX transmission, the destination name of the destination information 308 included in the PCFAX transmission job information 300 is stored in the destination name 404, and the destination number of the destination information 308 included in the PCFAX transmission job information 300 is stored in the destination address 405.

A job identification number assigned per job is stored in the identification number 406. A communication mode such as transmission, broadcast transmission, direct transmission, timer transmission, and PCFAX transmission is stored in the communication mode 407. The number of communicated pages is stored in the sheet count 408. In the communication result 409, "0" is stored when transmission has normally ended, and an error code number is stored when transmission has abnormally ended.

In the management table 400 shown in FIG. 4, for example, a communication history 410 is stored as the PCFAX transmission history. As the communication history 410, for example, the login name "tanaka", the transmission data and time "2016/6/20 10:46", the communication duration "22", the destination name "Company R", and the destination address "0441113333" are set. Additionally, the identification number "0018", the communication mode "PCFAX transmission", the sheet count "1", and the error code "0" are set as the communication history 410. In the management table 400, a plurality of other communication histories are also stored.

Notification Destination Registration Screen

Figure 5:
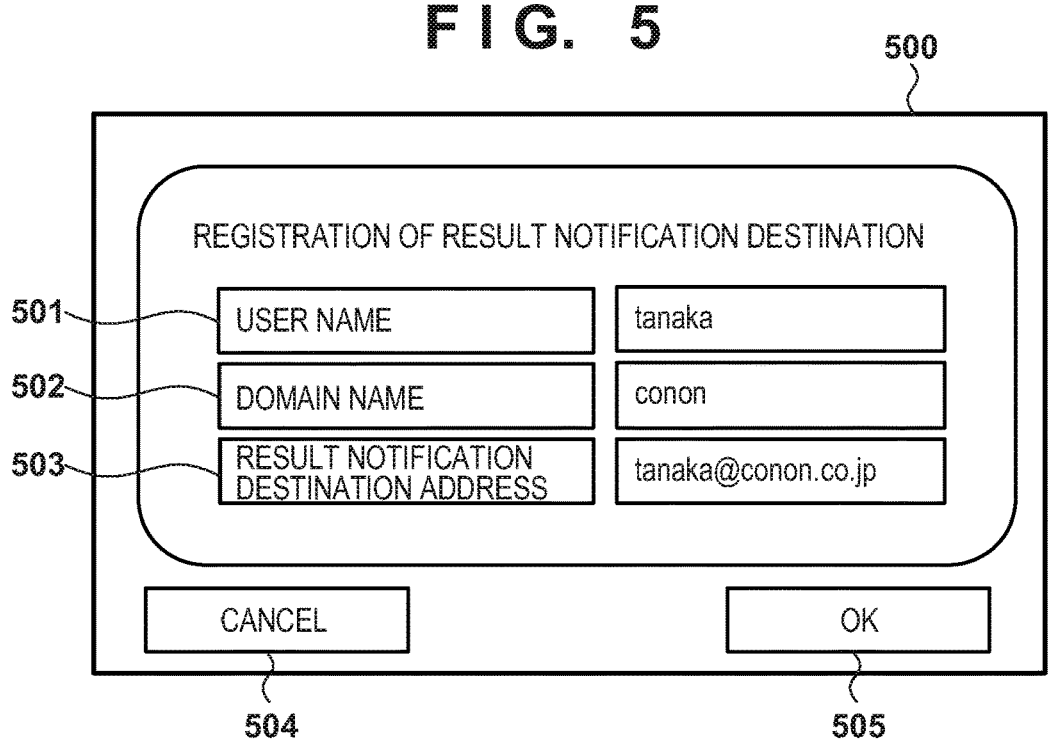
FIG. 5 is a diagram showing a screen to register result notification destination information that is included in the image communication apparatus 104 according to an embodiment.

Next, a screen to register result notification destination information in a user mode setting in the image communication apparatus 104 will be described with reference to FIG. 5. The user mode setting refers to performing setting and registration of various functions of the image communication apparatus in accordance with a user operation, and makes it possible to perform various settings such as a transfer transmission setting, a destination table setting, and a report print setting, and the registration thereof. As shown in FIG. 5, a registration screen 500 for a result notification destination is provided and displayed on the operation unit display device 203.

With the registration screen 500 for a result notification destination, the following settings can be performed. A user name 501 is an area where a user login name, which is user information of a person who has requested a transmission job, is set in accordance with a user input. A domain name 502 is an area where a domain name of the client terminal of the person who has requested the transmission job is set in accordance with a user input. A result notification destination address 503 is an area where email address information of a transmission destination to which a transmission result is transmitted via email at the end of transmission is set. In the example shown in FIG. 5, the user name "tanaka", the domain name "conon", and the result notification destination address "tanaka@conon.co.jp" are set on the registration screen 500 for a result notification destination.

Finally, the result notification destination information is registered in a result notification destination list table by depressing an "OK" button 505, and thereafter, the display of the screen is ended. Alternatively, the display of the screen is ended by depressing a "cancel" button 504 without performing registration of the result notification destination.

Selection Screen

Figure 6:
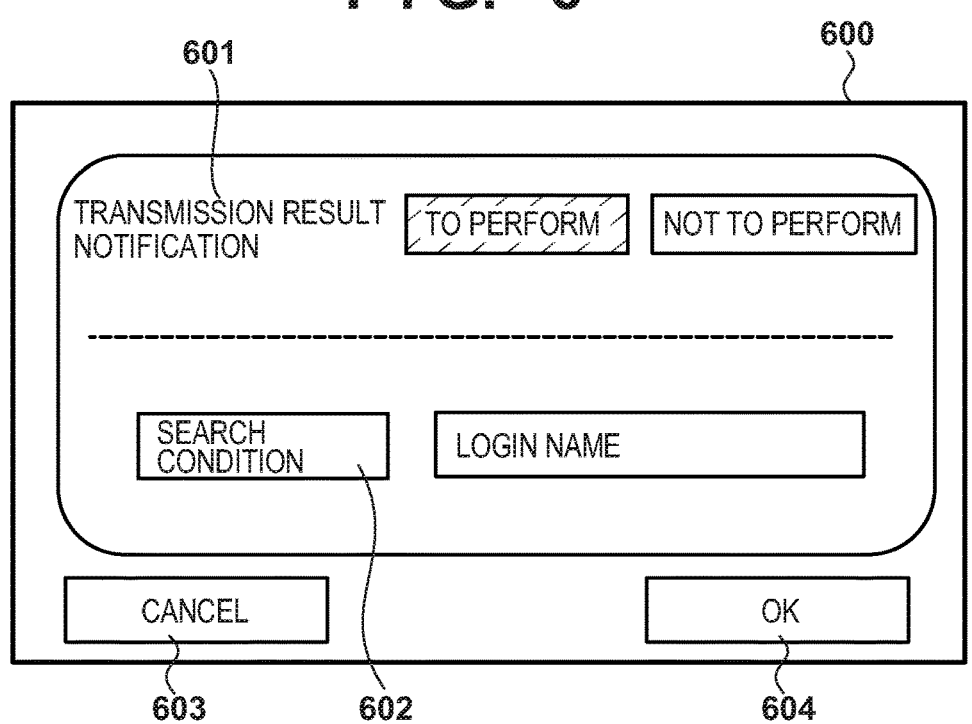
FIG. 6 is a diagram showing a setting screen to set whether or not to perform notification of a transmission result that is included in the image communication apparatus 104 according to an embodiment.

Next, a selection screen to select whether or not to perform notification of a transmission result at the end of transmission in the user mode setting in the image communication apparatus 104 will be described with reference to FIG. 6. As shown in FIG. 6, a selection screen 600 is displayed on the operation unit display device 203.

With the selection screen 600, the following settings can be performed in accordance with a user input. A transmission result notification 601 is an area where whether or not to perform notification of a transmission result at the end of transmission is set. Setting "to perform" on the screen enables a transmission result notification function, and a transmission result is transmitted at the end of transmission to a result notification destination that matches the search condition. On the other hand, setting "not to perform" disables the transmission result notification function, and the result notification is not performed.

Then, when the above-described transmission result notification function is enabled, a search condition 602 can be set. The search condition 602 is an area where which of the transmission job information notified from the client terminal at the time of PCFAX transmission is set as the search condition is designated. As the search condition "login name" or "login name+domain name" can be set. When the "login name" is set, the result notification destination associated with the login name that matches the login name 302 (user name) notified from the client terminal is retrieved from a result notification destination list table, which will be described later. On the other hand, when the "login name+ domain name" is set, the result notification destination associated with the login name and the domain name that match the login name 302 and the domain name 303 that have been notified from the client terminal is retrieved from the result notification destination list table, which will be described later. Here, the result notification destination that matches both the login name 302 and the domain name 303 is retrieved from the result notification destination list table, which will be described later. However, a result notification destination that matches one of the login name 302 and the domain name 303 may be retrieved.

Finally, the setting of transmission result notification is saved in the SRAM unit included in the system memory 206 by depressing an "OK" button 604, and thereafter the display of the screen is ended. Alternatively, the display of the screen is ended by depressing a "cancel" button 603, without saving the setting of the transmission result notification.

Result Notification Destination List Table

Next, a result notification destination list table 700, which is a list of the plurality of result notification destinations set on the registration screen 500 will be described with reference to FIG. 7. The list table 700 is stored in the HDD 211.

In a login name 701, the user name 501 that is set by the user on the registration screen 500 is stored. Similarly, the domain name 502 is stored in a domain name 702. Similarly, the result notification destination address 503 is stored in a result notification destination address 703.

In the list table 700, for example, the login name "tanaka", the domain name "conon", and the result notification destination address "tanaka@conon.co.jp" are stored in association with each other as the result notification destination information 705. Note that a plurality of pieces of other result notification destination information are stored in the list table 700 shown in FIG. 7.

Transmission Result Report

Next, a display example of the transmission result report transmitted via email will be described with reference to FIG. 8. The example shown in FIG. 8 shows a transmission result report 800 when the user with the login name "tanaka" has instructed PCFAX transmission from an external apparatus to the image communication apparatus.

The aforementioned PCFAX transmission result is a communication history having the identification number 406 "0018" in the management table 400. A reception number 801 is a job identification number assigned for each job. In the present display example, the identification number 406 "0018" is displayed. A start time 802 is a communication start time. In the present display example, the transmission data and time 402 "2016/6/20 10:46" is displayed.

A page count 803 is the number of transmitted pages. In the present display example, the sheet count 409 "1" is displayed. A communication result 804 is classified into an untransmitted destination, a transmitted destination, and an error destination for display. The destination number is displayed to an untransmitted destination when transmission ends without connecting to the destination, to a transmitted destination when transmission has normally ended, or to an error destination when communication has ended with an error.

In the present display example, "0" is held in the error code 409 of the communication history having the identification number 406 "0018", or in other words, the destination address 405 "0441113333" is displayed in the column of the transmitted destination in order to indicate that transmission has normally ended. Alternatively, "- - - -" meaning that there is no corresponding information is displayed in the untransmitted destination and the error destination.

Processing Procedure

Figure 9:
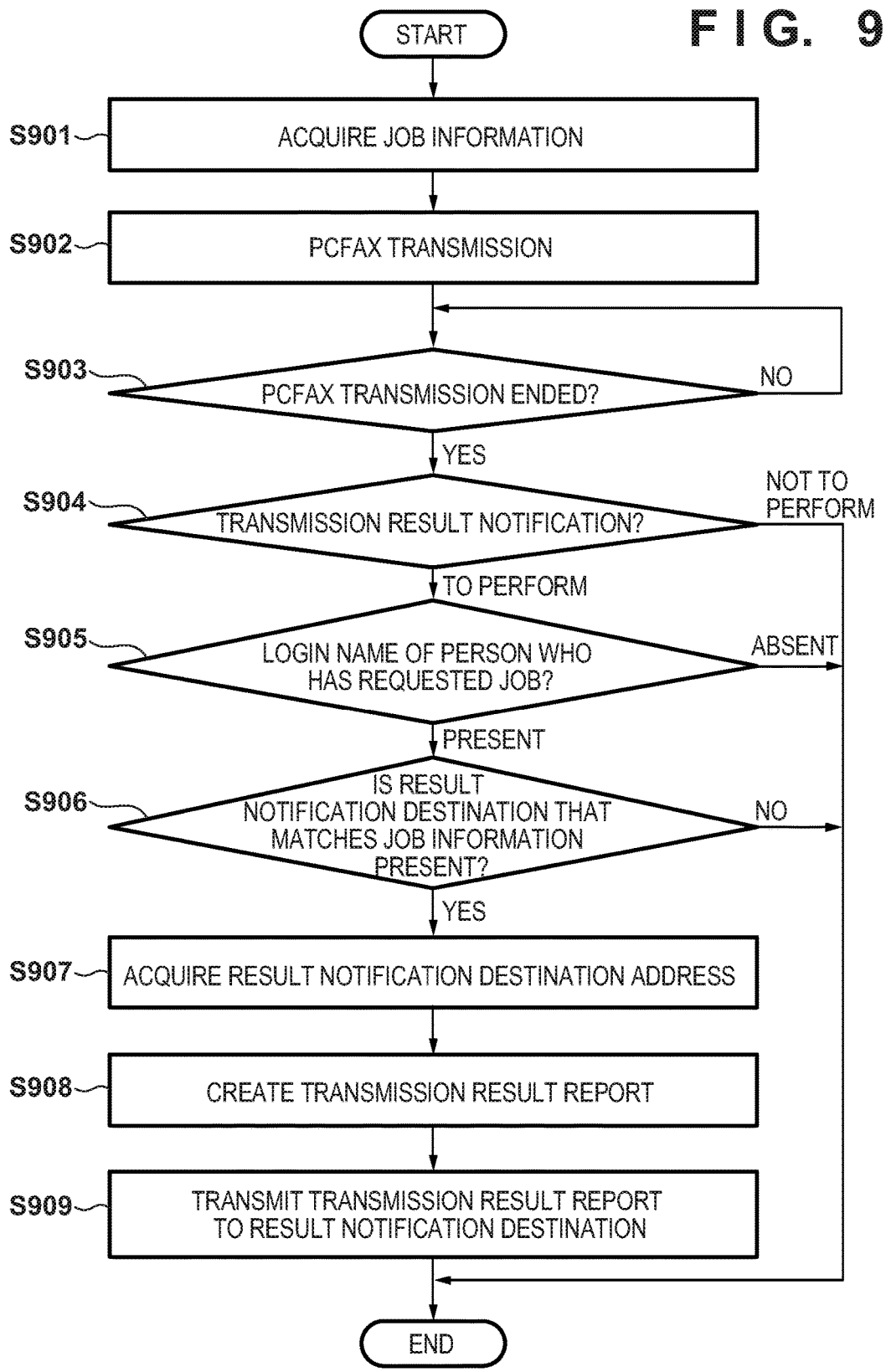
FIG. 9 is a flowchart illustrating operations of the image communication apparatus 104 according to an embodiment.

Next, a processing procedure according to the present embodiment will be described with reference to the flowchart in FIG. 9. The processing described below can be implemented, for example, by the system control unit 208 reading a control program stored in advance in the ROM unit included in the system memory 206, and executing the control program in a centralized manner. The present flowchart illustrates a processing procedure performed when the image communication apparatus 104 executes PCFAX transmission upon receipt of a PCFAX transmission instruction, and transmits a transmission result report to a result notification destination that matches the user information notified from the client terminal.

At S (step) 901, the network control unit 205 receives the PCFAX transmission job information 300 notified from the client terminal 101 via the network 100, and saves the received information in the SRAM unit included in the system memory 206. Then, concurrently, the network control unit 205 receives a facsimile-transmitted image, and saves the received image in the HDD 211.

Next, at S902, the facsimile control unit 210 originates a call in accordance with the destination information 308 included in the PCFAX transmission job information 300 acquired at S901 above so as to establish communication. Upon establishment of communication, the facsimile control unit 210 transmits, via the PSTN line 105, the transmitted image data accumulated in the HDD 211, to the transmission destination facsimile apparatus 106. Subsequently, at S903, the facsimile control unit 210 monitors the end of facsimile transmission. Then, if transmission has ended, the procedure proceeds to S904.

Next, at S904, the facsimile control unit 210 refers to the information that has been set via the selection screen 600 in the user mode setting saved in the SRAM unit included in the system memory 206, and acquires information as to whether or not to perform the transmission result notification 601. Then, if the transmission result notification 601 is "to perform", the facsimile control unit 210 further acquires the search condition 602, and the procedure proceeds to S905. If the transmission result notification 601 is "not to perform", the processing of the present flowchart ends.

Next, at S905, the facsimile control unit 210 refers to the login name 302 included in the PCFAX transmission job information 300 acquired at S901 above. If a login name is notified from the client terminal, the procedure proceeds to S906. If no login name is notified, the processing of the present flowchart ends. In addition, here, if the search condition 602 selected via the above-described selection screen 600 includes the login name and the domain name, it is determined whether a login name and a domain name have been notified from the client terminal. That is, here, it is determined whether the user information necessary as the search condition for the list table 700 for the currently set user has been notified from the client terminal.

Next, at S906, the facsimile control unit 210 refers to the search condition 602 in the user mode setting, and retrieves the result notification destination that matches the job information from the list table 700 in accordance with the search condition. More specifically, if the search condition 602 is "login name", it is determined whether the result notification destination information in which the login name 302 notified from the client terminal matches the login name 701 in the list table 700 is present as the search condition. For example, if the login name 302 notified from the client terminal is "tanaka", this matches the login name 701 "tanaka" in the result notification destination information 705 in the list table 700.

If the search condition 602 is "login name+domain name", the facsimile control unit 210 checks whether the result notification destination information in which the login name 302 matches the login name 701 and the domain name 303 matches the domain name 702 is present as the search condition. For example, if the login name 302 and the domain name 303 notified from the client terminal are "tanaka" and "conon", they match the login name 701 "tanaka" and the domain name 702 "conon" in the result notification destination information 705. However, if the domain name 303 is "conon 2", there is no matching result notification destination information in the list table 700.

If the matching result notification destination information is present in the list table 700, the procedure proceeds to S907. If it is absent, the processing of the present flowchart ends. Subsequently, at S907, the facsimile control unit 210 acquires the result notification destination address that matches the login name 302 and the domain name 303 notified from the client terminal from the list table 700, and the procedure proceeds to S908. For example, if the login name 302 and the domain name 303 notified from the client terminal are "tanaka" and "conon", the facsimile control unit 210 acquires "tanaka@conon.co.jp" as the result notification destination address of the result notification destination information 705.

Next, at S908, the facsimile control unit 210 creates a transmission result report that is to be transmitted to the address of the result notification destination acquired at S907 above, based on the transmission result included in the management table 400. For example, if PCFAX transmission has been performed for the login name 302 "tanaka" notified from the client terminal, the communication history of the PCFAX transmission job corresponds to the history of the login name 401 "tanaka" included in the management table 400. In this case, a transmission result report is created that indicates that the reception number 801 is the identification number 406 "0018", the start time 802 is the transmission data and time 402 "2016/6/20 10:46", the page count 803 is the sheet count 409 "1", and the communication result 804 is the error code 409 "0". Since the error code 409 is "0", it is indicated that transmission has normally ended.

Next, at S909, in order to send the transmission result report created at S908 above to the result notification destination address acquired at S907 above, the facsimile control unit 210 performs email transmission instruction via the network control unit 205. In the email that is to be transmitted, for example, the "tanaka@conon.co.jp", which is the result notification destination address, is set in the "To" field. In the "subject" field, "transmission result report 0016" indicating the transmission result report and the reception number is set. In addition, an email composed of the text data created at S908 above is set in the text of the email.

As described thus far, the image communication apparatus of the present embodiment receives, from an external apparatus serving as a client terminal, a facsimile transmission instruction including image data, a transmission destination of facsimile transmission, and user information, and performs facsimile transmission of the image data to the instructed transmission destination. In addition, the image communication apparatus of the present embodiment retrieves, by using the user information included in the instruction, the corresponding notification destination from a table that is stored in advance in the HDD 211 or the like, and in which a plurality of notification destinations to which a transmission result of the executed facsimile transmission is notified are registered. Furthermore, when the notification destination corresponding to the user information is retrieved, the image communication apparatus of the present embodiment transmits a transmission result of facsimile transmission to the retrieved destination. Thus, according to the present embodiment, the user does not have to set a notification destination of a transmission result for each transmission in the external apparatus that issues a job to the image communication apparatus, making it possible to prevent erroneous transmission of a transmission result due to an erroneous input, and also to reduce the operation load on the user.

The present invention is not limited to the above-described embodiment, and various modifications are possible. For example, the list table 700 described in the above embodiment may not be necessarily saved in the image communication apparatus 104, and may be saved in a server or a storage on the network. Further, the result notification destination address described in the above embodiment may be acquired from an authentication server on the network. More specifically, user information including the login name 302 is notified to the authentication server on the network. Then, the authentication server transmits the email address that matches the user information to the image communication apparatus 104. The image communication apparatus 104 sets the received mail address as the result notification destination address, and transmits the transmission result report to the address.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046506 filed on Mar. 10, 2017, which is hereby incorporated by reference herein in its entirety.

What is claimed is:

1. A facsimile apparatus comprising:
a memory that stores user identification information and a notification destination of a transmission result of a facsimile transmission;
a network interface that receives, from an external apparatus, image data, a transmission destination of a facsimile transmission, and user identification information; and
a facsimile controller that executes facsimile transmission of the image data to the transmission destination set by a user at the external apparatus, wherein the user can set a transmission destination that is different from the external apparatus as the transmission destination of the facsimile transmission;
wherein the network interface transmits a transmission result of the facsimile transmission executed by the facsimile controller to the notification destination associated with the user identification information received by the network interface,
wherein the memory has already stored the user identification information and the notification destination before the user identification information is received by the network interface.

2. The facsimile apparatus according to claim 1, further comprising:
a controller that registers, in the memory, user identification information, a domain name, and the notification destination that have been input via a screen provided by the facsimile apparatus.

3. The facsimile apparatus according to claim 2, wherein the facsimile controller sets, in accordance with a user input, whether or not to execute transmission of the transmission result; and,
in a case where transmission of the transmission result is set to be executed, the facsimile controller transmits the transmission result of the facsimile transmission to the notification destination.

4. The facsimile apparatus according to claim 3, wherein the facsimile controller sets, in accordance with a user input, a search condition for performing retrieval of a notification destination from the memory.

5. The facsimile apparatus according to claim 4, wherein in a case where user identification information is set as the search condition, the facsimile controller retrieves, from the memory, a notification destination associated with user identification information that matches the set user identification information.

6. The facsimile apparatus according to claim 4, wherein in a case where user identification information and a domain name are set as the search condition, the facsimile controller retrieves, from the memory, a notification destination associated with user identification information and a domain name that match the set user identification information and the set domain name.

7. The facsimile apparatus according to claim 1, wherein the memory further stores a plurality of transmission histories including a transmission result of the executed facsimile transmission, and
the network interface transmits, from among the plurality of transmission histories stored in the memory, information on a transmission history that matches the user identification information of the facsimile transmission as a transmission result to the notification destination.

8. The facsimile apparatus according to claim 1, wherein the network interface transmits the transmission result with email to the notification destination.

9. A control method of a facsimile apparatus including a memory that stores user identification information and a notification destination of a transmission result of a facsimile transmission, the control method comprising:
receiving, by a network interface and from an external apparatus, image data, a transmission destination of a facsimile transmission, and user identification information;
executing, by a facsimile controller, facsimile transmission of the image data to the transmission destination set by a user at the external apparatus, wherein the user can set a transmission destination that is different from the external apparatus as the transmission destination of the facsimile transmission; and
transmitting, by the network interface, a transmission result of the facsimile transmission executed by the facsimile controller to the notification destination associated with the user identification information received by the network interface,
wherein the memory has already stored the user identification information and the notification destination before the user identification information is received by the network interface.

10. A non-transitory computer-readable storage medium storing a computer program for causing a computer to execute steps of a control method of a facsimile apparatus including a memory that stores user identification information and a notification destination of a transmission result of a facsimile transmission, the control method comprising:
receiving, by a network interface and from an external apparatus, image data, a transmission destination of a facsimile transmission, and user identification information;
executing, by a facsimile controller, the facsimile transmission of the image data to the transmission destination included in set by a user at the external apparatus, wherein the user can set a transmission destination that is different from the external apparatus as the transmission destination of the facsimile transmission; and
transmitting, by the network interface, a transmission result of the facsimile transmission executed by the facsimile controller to the notification destination associated with the user identification information received by the network interface,
wherein the memory has already stored the user identification information and the notification destination before the user identification information is received by the network interface.

* * * * *